United States Patent
Kuo

(10) Patent No.: US 8,831,421 B2
(45) Date of Patent: Sep. 9, 2014

(54) CAMERA MODULE HAVING GUIDING ROD AND LENS HOLDER SLEEVE MOVING ALONG GUIDING ROD

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/931,521

(22) Filed: Jun. 28, 2013

(65) Prior Publication Data

US 2014/0205275 A1    Jul. 24, 2014

(30) Foreign Application Priority Data

Jan. 24, 2013 (TW) .............................. 102102553 U

(51) Int. Cl.
*G03B 3/10* (2006.01)
*G03B 17/00* (2006.01)
*G03B 13/34* (2006.01)

(52) U.S. Cl.
CPC ...................................... *G03B 13/34* (2013.01)

USPC ......................................... 396/133; 396/529

(58) Field of Classification Search
CPC ............... G03B 3/02; G02B 7/04; G02B 7/05
USPC .................... 396/79, 133, 529; 348/373–374; 359/822–824
See application file for complete search history.

(56) References Cited

U.S. PATENT DOCUMENTS

| 8,391,701 | B1 * | 3/2013 | Wu ............................... 396/133 |
| 2008/0085110 | A1 * | 4/2008 | Su et al. ....................... 396/133 |
| 2012/0148222 | A1 * | 6/2012 | Chou ............................ 396/133 |

* cited by examiner

*Primary Examiner* — WB Perkey
*Assistant Examiner* — Minh Phan
(74) *Attorney, Agent, or Firm* — Novak Druce Connolly Bove + Quigg LLP

(57) ABSTRACT

A camera module includes a guiding rod made of metal, a lens holder, a guiding sleeve made of metal, and a lens unit. The guiding sleeve is connected to the lens holder, and is sleeved on the guiding rod. The lens unit is received in the lens holder. The material of the guiding rod and the guiding sleeve permits a more controlled and precise movement of the guiding sleeve on the guiding rod in obtaining focus, friction force between the guiding rod and the guiding sleeve is decreased, and the degree of precision achieved will endure for a significantly longer time.

7 Claims, 3 Drawing Sheets

CAMERA MODULE HAVING GUIDING ROD AND LENS HOLDER SLEEVE MOVING ALONG GUIDING ROD

BACKGROUND

1. Technical Field

The present disclosure relates to camera modules and, particularly, to a camera module having a guiding rod and a lens holder moving along a guiding rod.

2. Description of Related Art

Camera modules generally include guiding rods and a lens holder. The lens holder defines guiding holes extending alongside the optical axis of the lens holder. The guiding rods slidably insert through the guiding holes. Thus, the lens holder can be guided to move along the guiding rods (i.e., the optical axis) to find a focused position. However, the lens holder is typically made of plastic while the guiding rods are made of metal. A friction force between the lens holder and the guiding rods is larger than satisfactory, resulting in a decrease in precision and a lower power efficiency camera module. In addition, the guiding holes will deform after a time of service life and can not move exactly parallel to the optical axis anymore, which decreases focusing accuracy.

Therefore, it is desirable to provide a camera module, which can overcome the limitations described.

DETAILED DESCRIPTION

Embodiments of the disclosure will be described with reference to the drawings.

Figure 1:
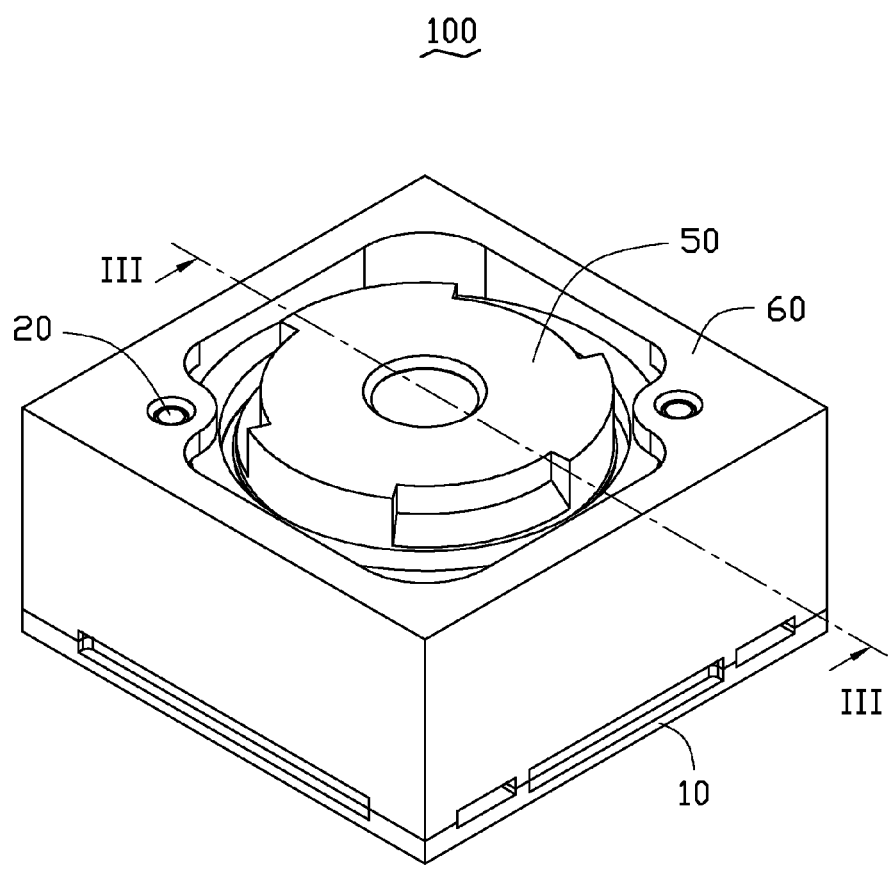
FIG. 1 is an isometric view of a camera module in accordance with an exemplary embodiment.
Figure 2:
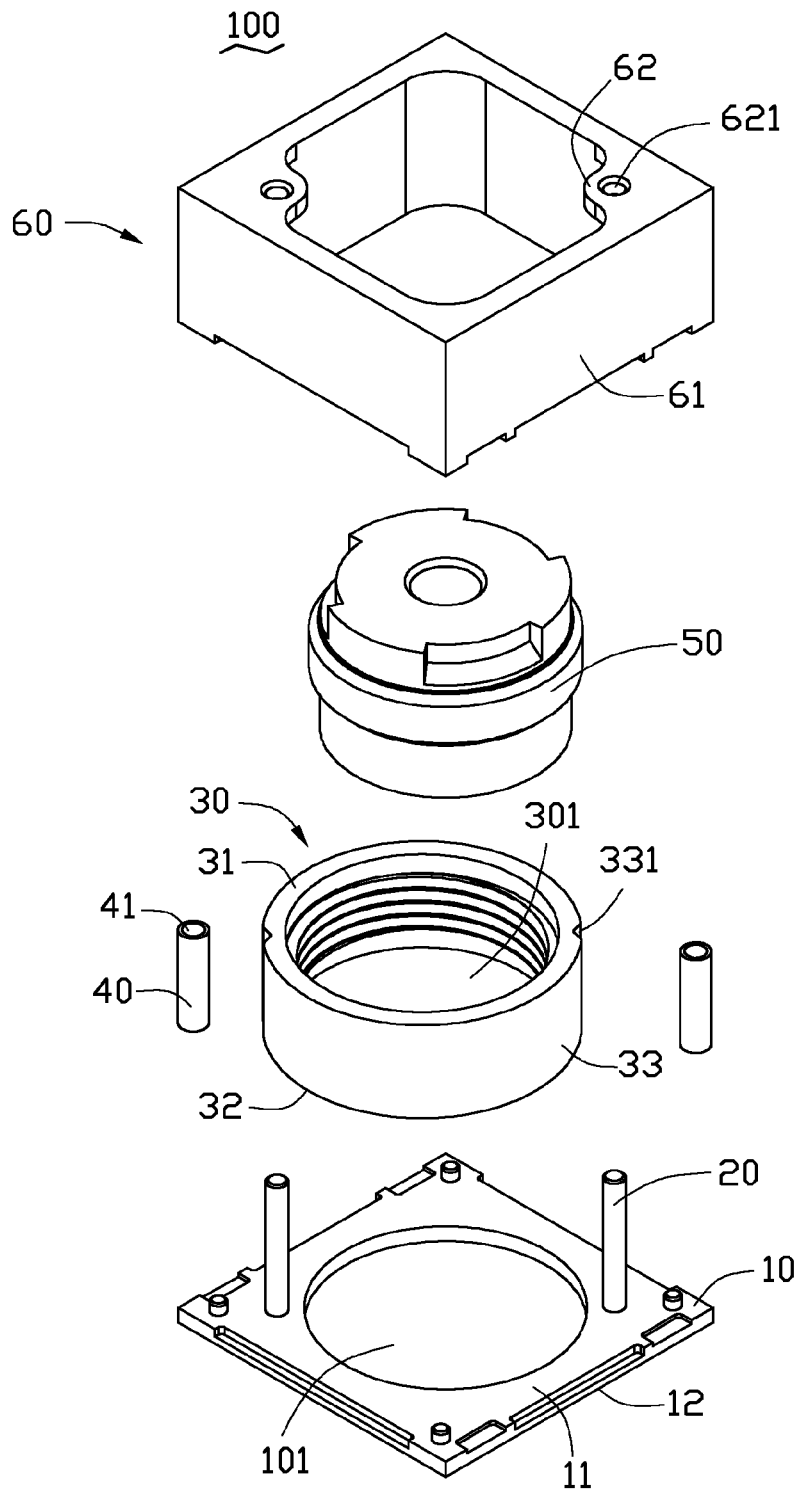
FIG. 2 is an isometric, exploded, and schematic view of the camera module of FIG. 1.
Figure 3:
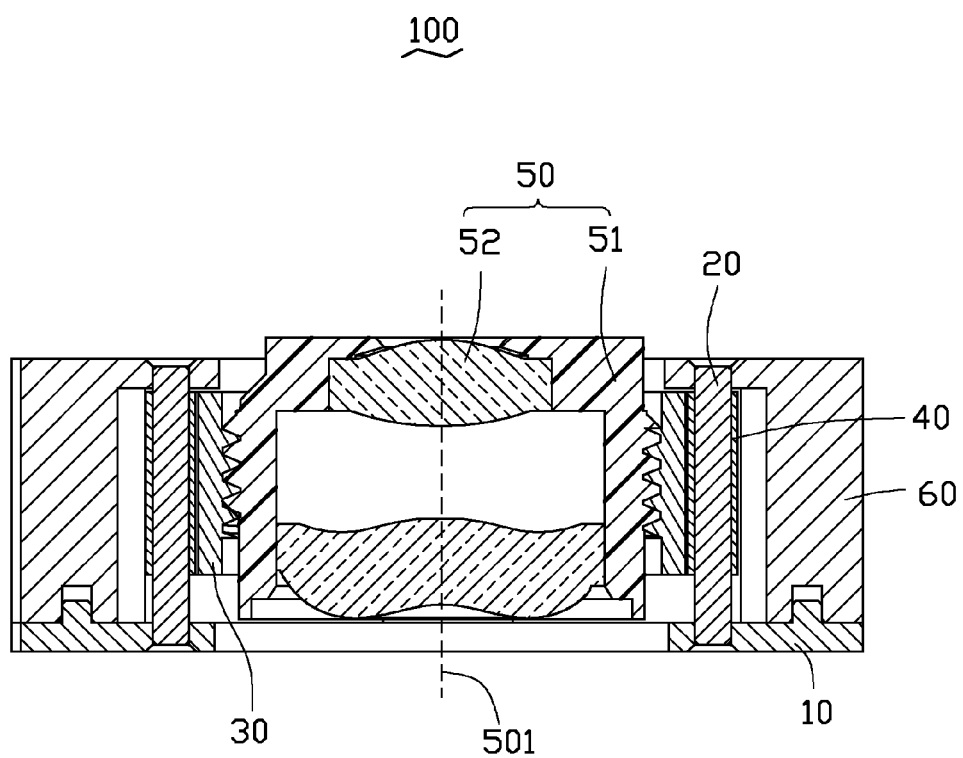
FIG. 3 is a cross-sectional view taken along a line of FIG. 1.

FIGS. 1-3 show a camera module 100 used in an electronic device (not shown), according to an exemplary embodiment. The camera module 100 includes a substrate 10, at lease one guiding rod 20, a lens holder 30, at lease one guiding sleeve 40, a lens unit 50, and a case 60. In the embodiment, the camera module 100 is driven by a voice coil motor, a magnetic suspension motor, or other suitable driver, to find a focusing point.

The substrate 10 includes an upper surface 11 and a lower surface 12 opposite to the upper surface 11. The substrate 10 defines a through hole 101 penetrating the upper surface 11 and the lower surface 12.

The at lease one guiding rod 20 is made of metal, and is perpendicularly positioned on the upper surface 11 of the substrate 10. The at lease one guiding rod 20 is adjacent to the through hole 101. In the embodiment, the camera module 100 includes two guiding rods 20. The two guiding rods 20 are positioned on an extending line through a diameter of the through hole 101 on opposite sides of the through hole 101. The two guiding rods 20 are parallel with each other, and are made of copper.

The lens holder 30 is plastic, and includes a top surface 31, a bottom surface 32 opposite to the top surface 31, and a side surface 33 connected between the top surface 31 and the bottom surface 32. The lens holder 30 defines a receiving hole 301 penetrating the top surface 31 and the bottom surface 32. The lens holder 30 defines at least one position recess 331 on the side surface 33, and the at least one position recess 331 extends through the top surface 31 and the bottom surface 32. In the embodiment, the lens holder 30 defines two position recesses 331 on the side surface 33. The two position recesses 331 are positioned on a plane through the diameter of the receiving hole 301, on opposing sides of the receiving hole 301.

The at lease one guiding sleeve 40 is made of metal, and includes a guiding hole 41. The diameter of the at lease one guiding hole 41 is slightly greater than the diameter of the guiding rod 20. The guiding sleeve 40 is positioned on the side surface 33 of the lens holder 30, and part of the guiding sleeve 40 is received in the position recess 331. An extending direction of the guiding hole 41 is perpendicular to the top surface 31 and the bottom surface 32. The guiding sleeve 40 extends along a direction perpendicular to the top surface 31 and the bottom surface 32. The guiding sleeve 40 is adhered on the lens holder 30 by glue. In the embodiment, the camera module 100 includes two guiding sleeves 40 made of copper.

The lens unit 50 includes a lens barrel 51 and at least one lens 52 received in the lens barrel 51. The lens unit 50 has an optical axis 501. In the embodiment, the lens unit 50 includes two lenses 52 received in the lens barrel 51.

The case 60 is cuboid, and includes four sidewalls 61 and at least one flange plate 62. The four sidewalls 61 are connected to each other from beginning to end, and form a receiving room. The at least one flange plate 62 is connected between two adjacent sidewalls 61, and is positioned at the outermost end of the sidewalls 61. Each flange plate 62 defines a position hole 621. In the embodiment, the case 60 includes two flange plates 62, the two flange plates 62 are positioned at two opposite corners of the sidewalls 61.

During assembly, the guiding sleeve 40 is sleeved on the guiding rod 20. The guiding rod 20 is clearance fit with the guiding sleeve 40. The lens unit 50 is received in the receiving hole 301. A center of the through hole 101 is on the optical axis 501. A guiding direction of the guiding rod 20 is parallel with the optical axis 501. The case 60 is positioned on the upper surface 11 of the substrate 10. The guiding rod 20, the lens holder 30, and the guiding sleeve 40 are received between the case 60 and the substrate 10. One end of the guiding rod 20 facing away from the substrate 10 is received in the position hole 621.

In other embodiments, the guiding rod 20 can be positioned on the case 60, and the guiding sleeve 40 can be connected to the lens holder 30 by a connecting element (not shown).

During the process of focusing, a motor (not shown) drives the lens holder 30 to find the focusing point. The lens holder 30 moves the lens unit 50 along the guiding rod 20. As the guiding rod 20 and the guiding sleeve 40 are made of metal, a friction force between the guiding rods 20 and the guiding sleeves 40 is decreased. The guiding hole 41 will not be enlarged under a reciprocating motion of the lens holder 30, the focusing accuracy of the lens holder 30 is increased.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A camera module, comprising:
at least one guiding rod made of metal;
a lens holder;

at least one guiding sleeve made of metal, the at least one guiding sleeve directly connected to a side surface of the lens holder and sleeved on the at least one guiding rod; and a lens unit received in the lens holder;

wherein the lens holder comprises a top surface, a bottom surface opposite to the top surface, and a side surface connected between the top surface and the bottom surface; the lens holder defines at least one position recess on the side surface, and the at least one position recess extends through the top surface and the bottom surface; each of the at least one guiding sleeve is partially received in a respective one of the at least one position recess.

2. The camera module of claim 1, comprising a substrate, wherein the at least one guiding rod is positioned on the substrate.

3. The camera module of claim 2, comprising a case, wherein the case is positioned on the substrate, and all of the at least one guiding rod, the lens holder, and the at least one guiding sleeve are received between the case and the substrate.

4. The camera module of claim 1, wherein the lens holder defines a receiving hole penetrating the top surface and the bottom surface, and the lens unit is received in the receiving hole.

5. The camera module of claim 4, wherein the at least one guiding rod and the at least one guiding sleeve are made of copper.

6. The camera module of claim 5, wherein each of the at least one guiding sleeve defines a guiding hole, a diameter of the guiding hole is slightly greater than a diameter of the at least one guiding rod.

7. The camera module of claim 6, wherein an extending direction of the guiding hole is perpendicular to the top surface and the bottom surface.

* * * * *